United States Patent [19]

Trekel et al.

[11] 4,356,654
[45] Nov. 2, 1982

[54] TANDEM DRAGNETS

[75] Inventors: Rainer Trekel, Rostock; Uwe Lorenzen, Warnemünde; Wolfgang Rehme, Rostock; Rolf Dürr, Rostock; Hans G. Litschko, Rostock; Wilfried Thiele, Rostock, all of German Democratic Rep.

[73] Assignee: VEB Fischfang Rostock, Rostock, German Democratic Rep.

[21] Appl. No.: 181,533

[22] Filed: Aug. 26, 1980

[30] Foreign Application Priority Data

Jul. 18, 1979 [DD] German Democratic Rep. ... 214415

[51] Int. Cl.³ .............................................. A01K 73/02
[52] U.S. Cl. .................................................... 43/9
[58] Field of Search ...................................... 43/9, 104

[56] References Cited

U.S. PATENT DOCUMENTS

| 446,755 | 2/1891 | Johnson | 43/9 |
|---|---|---|---|
| 730,949 | 6/1903 | Miller et al. | 43/104 |

FOREIGN PATENT DOCUMENTS

| 164368 | 11/1949 | Austria | 43/9 |
|---|---|---|---|
| 714269 | 7/1965 | Canada | 43/9 |
| 5211 | of 1882 | United Kingdom | 43/9 |
| 895298 | 5/1962 | United Kingdom | 43/9 |
| 566545 | 7/1977 | U.S.S.R. | 43/9 |

*Primary Examiner*—Nicholas P. Godici
*Assistant Examiner*—Charles L. Willis
*Attorney, Agent, or Firm*—Jordan and Hamburg

[57] ABSTRACT

A tandem dragnet comprises a main dragnet having an open rear end and a rear dragnet enveloping a rear portion of the main dragnet including the open rear end. Support lines for the rear dragnet are connected to the harness lines of the main dragnet.

5 Claims, 1 Drawing Figure

— 1 —

TANDEM DRAGNETS

BACKGROUND OF THE INVENTION

The invention relates to a capture device to be used by stern-trawlers for high sea or coastal fishing.

Well known dragents are trailed through a school of fish with as large an opening of the net as possible in order to try to obtain the whole school. The school intercepted by the opening of the dragnet tires by being forced to swim along with the net, becomes concentrated due to the shape of the net and is guided into the rear part of the net. The flanks or wings of the net and the largest part of the belly of known dragnets consist of low resistance elements such as substantially parallel ropes in the midst of the net, oversized mesh of quadrilateral or hexagonal shape or of combinations of these elements. The connected belly part as well as funnel, tunnel and rear parts consist of netting, whose mesh size becomes smaller continually or in sections in the direction of the rear part.

Due to the load acting upon the funnel part when hauling the net onto the trawler, netting made of relatively thick cords has to be used for this area. When looking at these cords only from a hydrodynamical point of view, they are definitely oversized. They have high resistance to flow and thereby influence the trawling speed. The speed of trawling needed depends on the swimming speed of the fish and their specific behavior in a dragnet. Direct observations under water and practical successes of catch by known trawling nets have shown that only a part of the school caught by the opening of the trawling net arrives in the rear part of the net. A substantial part of the school escapes through the flanks or wings of the net. Due to the swimming along of the fish caught by the dragnet, they lose their strength and reduce their swimming speed and fall slowly back into the conical area of the trawling net. The densification which is caused by that causes the fish to try to flee in a panic through the net walls. A small part of the school succeeds as long as it is not yet within a small-meshed zone of the net and particularly those fish that still have the strength to swim forwards from the funnel part in order to be able to flee through the large mesh of the rear belly parts.

Underwater observations showed that fish which broke out move only very slowly and show no observable reactions towards the parts of the net sliding by. Dragnets were constructed which endeavored to prevent the flight of fish through the net wings or flanks by widening and extending the area of the net with very small mesh sizes, in other words the circumference of the rear part and of the funnel were enlarged and the area of the funnel was elongated. The disadvantage of this solution is that the large area of small mesh netting lowers the drag speed due to its large resistance to flow.

It has already been proposed to create an electric field within the dragnet in order to scare and desensitize the fish and to thereby prevent their escape (DD No. 61,670). This solution requires expensive devices for the production of electrical energy and to conduct it into the net. Also known are additional devices for dragnets in the shape of small meshed bags upon the dragnet wings as well as the use of cover rear parts and double rear parts for biological research work for the determination of the selectivity of bottom dragnets. Such devices cannot be used for commercial fishing. A so-called roof net has been proposed as an additional part of a bottom dragnet (DE No. 916,003). Here the top sheet of the net is superimposed by a second, broader sheet. Fish, which appear underneath the root net, are supposed to be guided through an opening in the top sheet back into the dragnet. The disadvantage of this construction is the rigid connection between roof net and top sheet. Bags form at the end of the roof net where the fish collect and are caught. The deformation of the dragnet body leads to defects of the net. Furthermore, a fishing device has been proposed, consisting of a netbag, serving for collection of the fish and a catching part connected by longitudinal ropes to the netbag and which is formed by a plurality of frustum-shaped spreading elements, arranged in tandem with free interstices (SU No. 403,386; SU No. 515,501). The weakness of this construction is, that increased speed of flow or suction effect within the catching part do not appear at an expected strength and do not influence the catching capability of the device. Even for a small-mesh netcloth, the increase of speed at the end of the frustum in the immediate proximity of the net wall amounts only to 5%. The wake behind the net frustum jacket, called a reverse eddy, does not scare the fish and is not able to prevent the escape of the fish through the spreading elements having free interstices.

It is an object of the invention to improve the effectiveness of the catch and to lower the expense of materials for the construction of dragnets.

Other objects and advantages of the invention will be apparent from the following description.

SUMMARY OF THE INVENTION

The invention makes it possible to catch again the fish which escape in front of the funnel of the dragnet and to reduce the mass of nets and ropework while keeping the apertures of a dragnet the same size and keeping the speed of dragging the same.

According to the invention, there is provided a tandem arrangement of a main dragnet and a rear dragnet which partly envelops the main dragnet. The main dragnet does not possess a rear part. Its ropes and net strings are substantially thinner than in known dragnets. The rear dragnet disposed behind the main dragnet and serving as its envelopment is connected by attachment lines to the harness or drag lines of the main dragnet. Therefore, the rear net and the back part of the main dragnet do not transfer any pulling forces upon each other, so that both nets do not exert upon each other any deforming influences either in the enveloping or in the enveloped area. The rear net captures the fish from the main dragnet and additionally captures all fish which escaped in the front of the main dragnet. When the rear net is correctly dimensioned, the whole sum of stream resistance of the tandem dragnet does not surpass the stream resistance of known dragnets. Due to the thin strings of the net material of the main dragnet, smaller amounts of material are needed for the construction of the tandem net.

The invention will now be further described by reference to a specific embodiment.

DETAILED DESCRIPTION OF A PREFERRED EMBODIMENT

Figure 1:
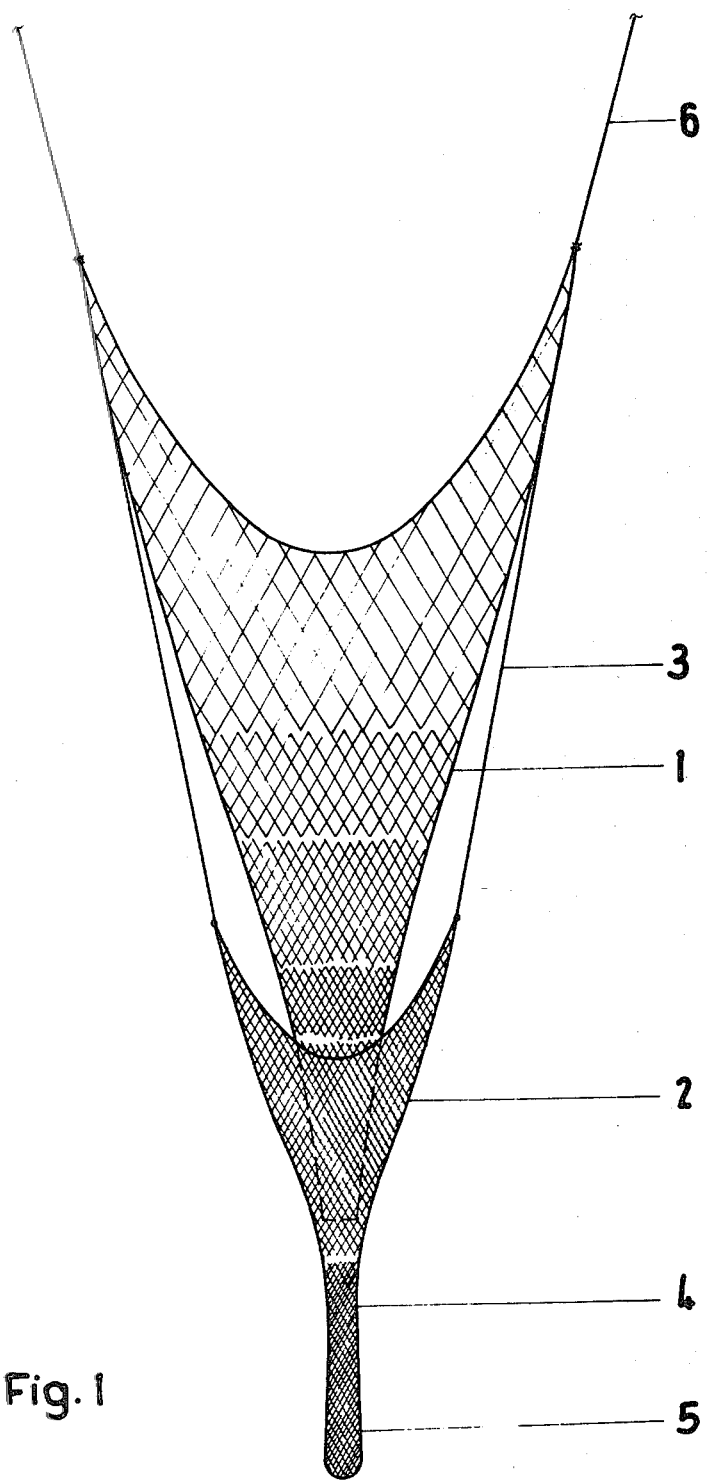
FIG. 1 is a plan view of a tandem dragnet according to the invention.

The tandem dragnet of FIG. 1 consists of a main dragnet 1 and a rear net 2. The rear net 2 is connected by the support lines 3 to the harness 6 of the main dragnet 1. The funnel part of main dragnet 1 protrudes into the rear net 2. The rear net 2 has a tunnel 4 and a rear 5. The pulling forces of the rear net 2 are connected by support lines 3 to the harness 6 (as illustrated) or to suitable pulling force conducting parts of the main dragnet 1.

We claim:

1. A tandem dragnet comprising,
    a main dragnet having an entry opening and an exit opening narrower than the entry opening, said main dragnet tapering from the entry opening toward the exit opening to surround and gather together fish which enter said entry opening, and
    a rear dragnet having an entry opening and a closed end and tapering from the entry opening toward the closed end, said rear dragnet being disposed behind said main dragnet such that the entry opening of the rear dragnet receives therein the exit opening of the main dragnet substantially concentrically, the entry opening of the rear dragnet being displaced from the rear part of the main dragnet at the point of entry of the main dragnet into the rear dragnet, thereby forming means to recapture fish initially captured by the main dragnet and then escaping from a flank of the main dragnet.

2. A tandem dragnet according to claim 1, further comprising harness lines attached to the periphery of the entry opening of the main dragnet to permit dragging of the main dragnet by a trawler, and support lines attached to the periphery of the entry opening of the rear dragnet, said support lines being connected to the harness lines so that the rear dragnet is directly supported by the harness lines.

3. A tandem dragnet according to claim 2, in which said main dragnet is made of a thinner material than the material required by a conventional dragnet of the same size.

4. A tandem dragnet according to claim 3, in which said main dragnet includes coarser mesh than said rear dragnet.

5. A tandem dragnet comprising,
    a main dragnet including an entry opening at a front end and an exit opening at a rear end thereof, said main dragnet tapering from the entry opening toward the exit opening in a funnel shape and being adapted to be hauled by means of harness lines attached to the periphery of said entry opening, and
    a rear dragnet including an entry opening at a front end and a rear closed end, said entry opening of said rear dragnet being about half the diameter of the entry opening of said main dragnet, said rear dragnet tapering from the entry opening thereof to the rear closed end in a funnel shape and being connected to said harness lines of said main dragnet by means of support lines so that the rear dragnet receives therein the exit opening of the main dragnet and overlies up to about one fourth of the axial length of the main dragnet including the exit opening of the main dragnet the entry opening of the rear dragnet being displaced from the rear part of the main dragnet at the point of entry of the main dragnet into the rear dragnet, thereby forming means to recapture fish initially captured by the main dragnet and then escaping from a flank of the main dragnet.

* * * * *